(12) United States Patent
Ryan et al.

(10) Patent No.: US 10,805,264 B2
(45) Date of Patent: Oct. 13, 2020

(54) AUTOMATIC HOSTNAME ASSIGNMENT FOR MICROSERVERS

(71) Applicant: Western Digital Technologies, Inc., San Jose, CA (US)

(72) Inventors: Robert P. Ryan, Mission Viejo, CA (US); Dean M. Jenkins, La Canada Flintridge, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 232 days.

(21) Appl. No.: 15/640,295

(22) Filed: Jun. 30, 2017

(65) Prior Publication Data

US 2019/0004826 A1 Jan. 3, 2019

(51) Int. Cl.
*H04L 29/12* (2006.01)
*H04L 12/24* (2006.01)
*G06F 13/20* (2006.01)

(52) U.S. Cl.
CPC ........ *H04L 61/609* (2013.01); *H04L 41/0806* (2013.01); *H04L 41/12* (2013.01); *H04L 61/3025* (2013.01); *H04L 61/6022* (2013.01); *G06F 13/20* (2013.01)

(58) Field of Classification Search
CPC ............. G06F 13/362; H04L 41/08–12; H04L 29/12254; H04L 29/12594; H04L 29/12622; H04L 61/2015; H04L 61/30; H04L 61/609; H04L 61/3025; H04L 61/6022; H04L 41/12; H04L 41/0806

See application file for complete search history.

(56) References Cited

U.S. PATENT DOCUMENTS

| 8,930,725 | B2 * | 1/2015 | Wang ................. H04L 12/6418 713/300 |
| 9,456,522 | B2 * | 9/2016 | Aimone ............... G06Q 10/087 |
| 2002/0105924 | A1 | 8/2002 | Yang et al. |
| 2008/0104424 | A1 | 5/2008 | Jennings |

(Continued)

OTHER PUBLICATIONS

Silicon Graphics International Corp, "SGI UV RMC Software User Guide" Document No. 007-6361-003, Nov. 2015, Chapter 3-4. (Year: 2015).*

(Continued)

*Primary Examiner* — Gregory G Todd
(74) *Attorney, Agent, or Firm* — Barry IP Law, P.C.

(57) ABSTRACT

A Chassis Baseboard Management Controller (CBMC) includes at least one memory for storing data related to a plurality of microservers in a server chassis. A request is received from a remote device for microserver hostnames to build a locality map for a storage or processing pool in a distributed storage or processing network. A device slot number corresponding to a physical location of the microserver in the server chassis is determined for each microserver. The determined device slot number is appended to a chassis hostname to create respective microserver hostnames. According to one aspect, a microserver hostname is received from a CBMC and stored in a memory of a μBMC of a microserver. The microserver hostname is retrieved from the memory by a processor of the microserver during a boot sequence. The retrieved microserver hostname is set as a hostname for communicating via at least one network interface.

12 Claims, 5 Drawing Sheets

(56) References Cited

U.S. PATENT DOCUMENTS

| | | | |
|---|---|---|---|
| 2008/0222310 A1 | 9/2008 | Karstens | |
| 2009/0055665 A1* | 2/2009 | Maglione | G06F 1/206 713/320 |
| 2012/0005344 A1* | 1/2012 | Kolin | H05K 7/20836 709/226 |
| 2013/0254361 A1* | 9/2013 | Liu | H04L 41/0806 709/223 |
| 2014/0344431 A1 | 11/2014 | Hsu et al. | |
| 2015/0089221 A1* | 3/2015 | Taylor | H04W 12/08 713/168 |
| 2015/0195246 A1* | 7/2015 | Ryu | H04L 61/2038 370/431 |
| 2016/0080210 A1 | 3/2016 | Lai et al. | |
| 2016/0104101 A1* | 4/2016 | Lambert | G06Q 10/087 705/28 |
| 2016/0349993 A1 | 12/2016 | Udupi et al. | |
| 2016/0381155 A1* | 12/2016 | Pan | H04L 67/18 709/221 |
| 2017/0139592 A1 | 5/2017 | Qin et al. | |
| 2017/0257275 A1* | 9/2017 | Atyam | H04L 41/0663 |
| 2017/0322613 A1 | 11/2017 | Lin et al. | |
| 2017/0364375 A1* | 12/2017 | Ku | G06F 9/44505 |
| 2018/0120914 A1* | 5/2018 | Donlin | G06F 1/28 |

OTHER PUBLICATIONS

Wikipedia, "Intelligent Platform Management Interface", May 21, 2016, https://web.archive.org/web/20160521152117/https://en.wikipedia.org/wiki/Intelligent_Platform_Management_Interface (Year: 2016).*

Hewlett-Packard Development Company, L.P., "HP MicroServer Remote Access Card User Manual", Feb. 2013, Edition 2.

Minyard, Corey, Montavista Software, "IPMI—A Gentle Introduction with OpenIPMI", Feb. 10, 2006.

Pending U.S. Appl. No. 15/640,234, filed Jun. 30, 2017, entitled "Baseboard Management Controllers for Server Chassis", Ryan et al.

* cited by examiner

AUTOMATIC HOSTNAME ASSIGNMENT FOR MICROSERVERS

BACKGROUND

The use of microservers is becoming increasingly popular due to their efficient use of space and scalability in locations such as data centers. Such microservers can include a main board including processing and memory resources on a single board. The microservers are typically grouped together in a server chassis to reduce the amount of space needed for the microservers and to share services provided by the server chassis such as fans and sensors. In some cases, the microservers may be converged microservers that also include one or more data storage devices, such as a Hard Disk Drive (HDD) or a Solid-State Drive (SSD).

In performing maintenance or setting up microservers, the microservers in a data center may be located by their hostname. Microservers are typically assigned individual hostnames based on their physical location, such as by including a site indicator, a rack indicator, and/or a chassis indicator, for example. These hostnames are usually manually assigned by a network administrator using, for example, a spreadsheet to match microservers to their location-specific hostnames. Software defined storage platforms, such as CEPH, Swift, RIAK, or Hadoop, may also use location-specific hostnames to map a distributed storage or processing pool based on the physical location of the microservers indicated in a required syntax or format for the hostnames.

However, as the number of microservers in a server network increases, the assignment of hostnames becomes increasingly time consuming, complicated, and prone to error. For example, a relatively large server chassis may include 60 to 96 microservers, and a rack of server chassis may include 10 server chassis, and a server site may include hundreds of racks. Assigning individual, location-specific hostnames to each microserver in such an example becomes significantly time consuming. In addition, making sure that numerous microserver hostnames assigned by a network administrator match a particular format for a software defined storage platform or are assigned without typographical errors can complicate the assignment of hostnames to microservers.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environment

Figure 1:
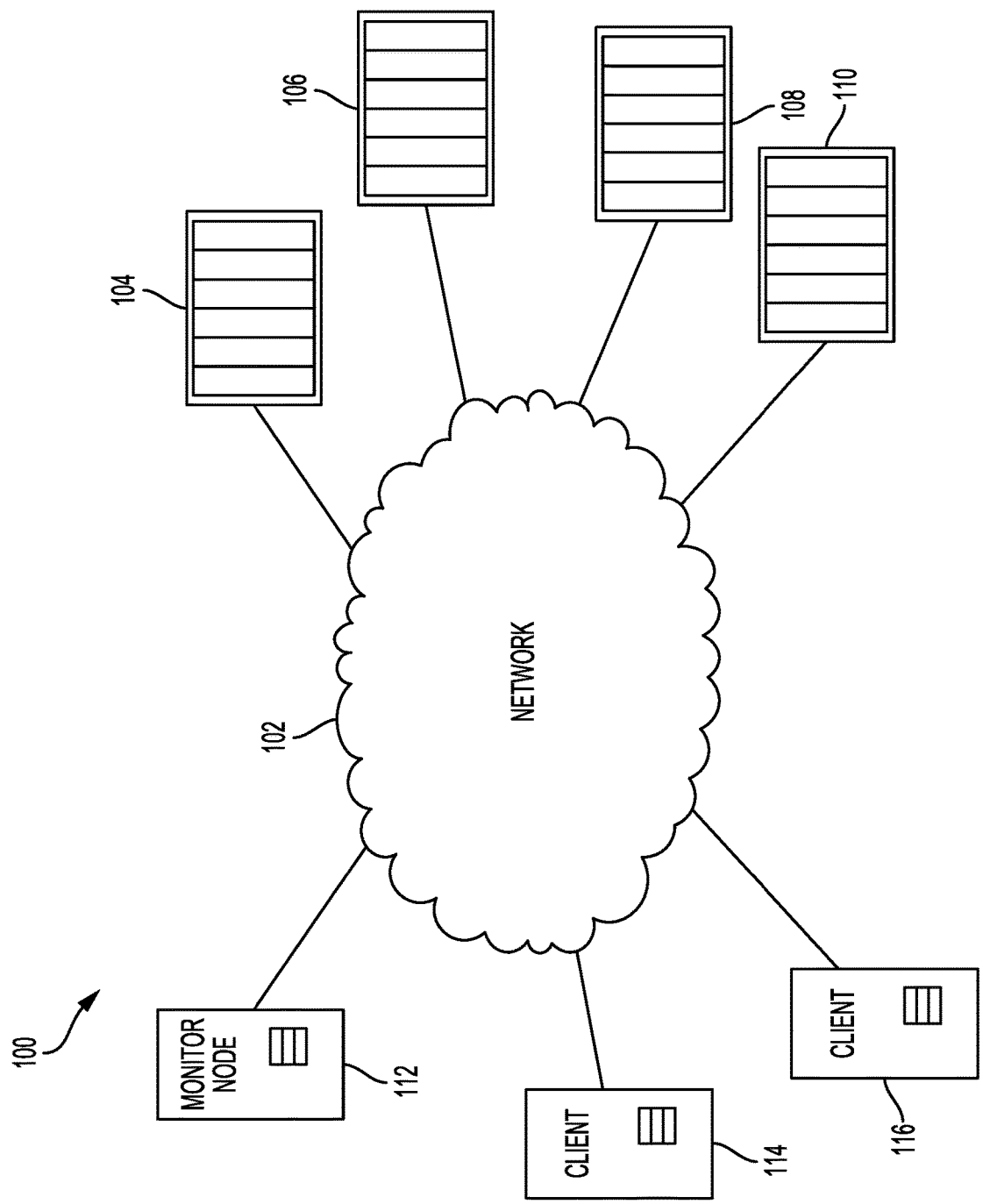
FIG. 1 depicts an example server network according to an embodiment.

FIG. 1 depicts an example server network according to an embodiment. As shown in FIG. 1, server network 100 includes network 102 connecting monitor node 112, client 114, client 116, and server chassis 104, 106, 108, and 110. In some implementations, server network 100 can include a data storage center or a data storage network for distributed data storage with converged microservers included in each of server chassis 104, 106, 108, and 110 providing data storage. In other implementations, server network 100 may be used for distributed computing performed by microservers included in each of server chassis 104, 106, 108, and 110.

For example, client 114 or client 116 may use microservers in one or more server chassis for storing data remotely such as for a cloud or social media application executed by the client or for a distributed computing or big data application executed by the client. In this regard, the devices shown in FIG. 1 for server network 100 may or may not be physically co-located so that network 102 may include a local area network, a wide area network, or the internet.

Monitor node 112 can include a client or other storage device that maps a locality of the microservers included in server network 100. Such a locality map may be performed by, for example, executing a software defined storage or distributed processing platform such as CEPH, Swift, Hadoop, or RIAK at monitor node 112. In the example of CEPH, monitor node 112 may build a Controlled Replication Under Scalable Hashing (CRUSH) locality map for distributing data objects among the microservers in server network 100, which may each serve as an Object Storage Device (OSD). In building a locality map of the microservers for distributing data or processing tasks, the software defined storage or processing platform takes into account a physical location of the node (e.g., a microserver) for considerations such as resiliency or the use of resources such as an available processing or storage capacity. In one example, monitor node 112 may store redundant portions of a data object in different server chassis so that the data object is still retrievable if one server chassis fails or otherwise becomes unavailable.

In building a locality map that considers a physical location of microservers, the storage or processing platform may require that a particular syntax or format is followed in naming microservers. Ensuring that this format is followed and reducing typographical errors can ordinarily improve the assignment of hostnames to microservers in terms of time and complexity, especially when assigning hostnames to thousands of microservers.

Those of ordinary skill in the art will appreciate that other implementations can include more or less than those components shown in FIG. 1 and that the processes discussed below can be implemented in other environments. For example, other implementations can include a different number of server chassis, clients, or monitor nodes. For example, some implementations may not include a monitor node in server network 100.

Example Server Chassis

Figure 2:
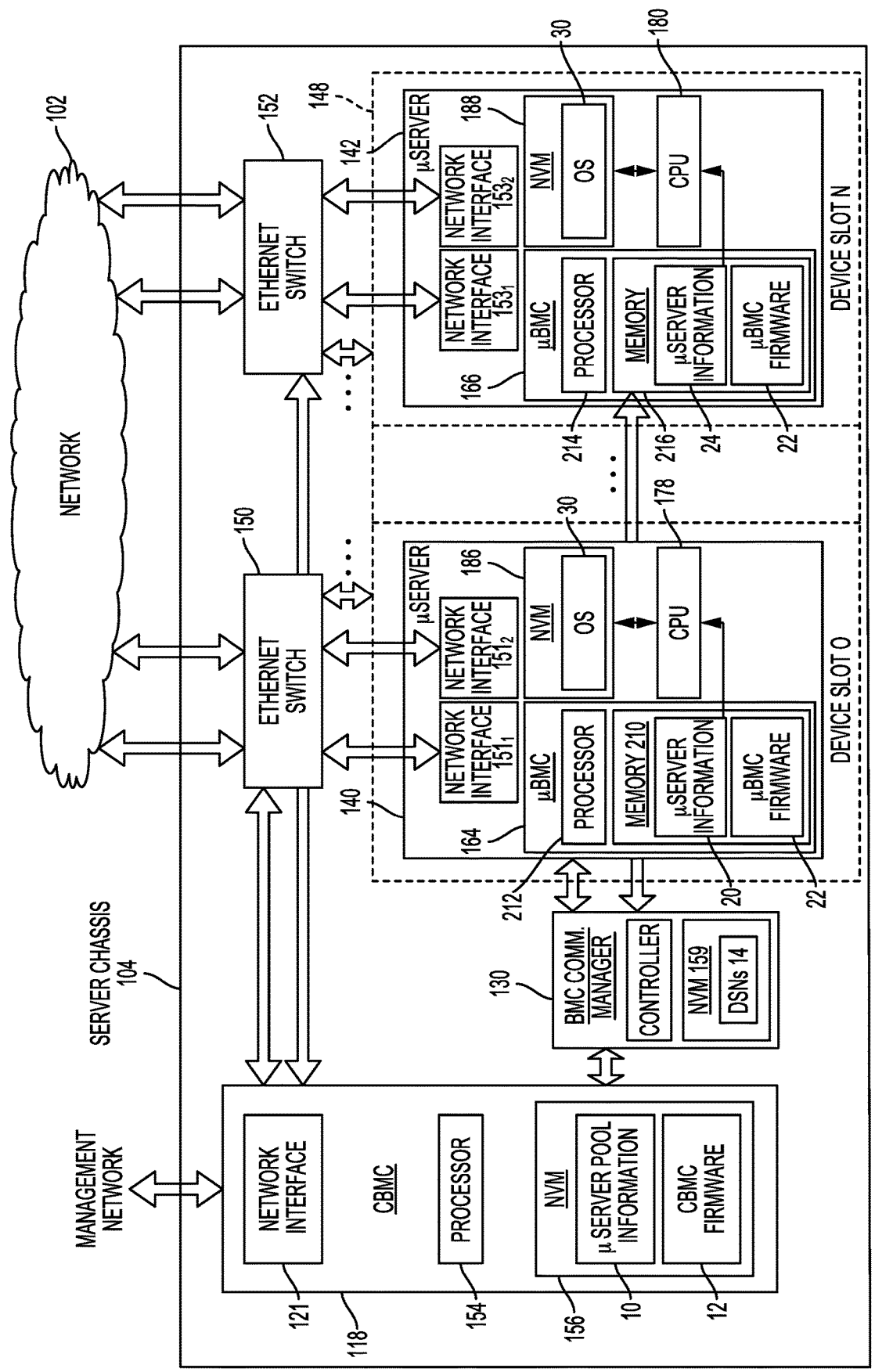
FIG. 2 is a block diagram of a server chassis including a Chassis Baseboard Management Controller (CBMC), and a pool of microservers according to an embodiment.

FIG. 2 is a block diagram of server chassis 104 according to an embodiment. As shown in FIG. 2, server chassis 104 includes a Chassis Baseboard Management Controller (CBMC) 118, Baseboard Management Controller (BMC) communication manager 130, and pool of microservers 148. Those skilled in the art will appreciate that some of the components shown for server chassis 104 in FIG. 2 may differ in other implementations. In this regard, examples of server chassis including a CBMC and a BMC communication manager, as well as microservers including Micro Baseboard Management Controllers (µBMCs), can be found in co-pending U.S. patent application Ser. No. 15/640,234, filed on Jun. 30, 2017, and entitled "BASEBOARD MANAGEMENT CONTROLLERS FOR SERVER CHASSIS", which is hereby incorporated by reference in its entirety.

As shown in FIG. 2, server chassis 104 connects to network 102 via Ethernet switches 150 and 152, which can manage a main or in-band data path used by the microservers in microserver pool 148 (i.e., microservers at device slots 0 to N). In more detail, each microserver in microserver pool 148 can connect to one or both of Ethernet switches 150 and 152 using, for example, a Serial Gigabit Media Independent Interface (SGMII). In some implementations, each microserver may connect to Ethernet switches 150 or 152 at speeds of 1 or 2.5 gigabits per second (i.e., for 1.0 Gigabit Ethernet (GbE) or 2.5 GbE). As understood by those of ordinary skill in the art, these example speeds are expected to increase for future implementations as costs decrease for communication and storage technology. For their part, Ethernet switches 150 and 152 can provide Ethernet data ports to a Top Of Rack (TOR) switch with a greater bandwidth (e.g., 10, 25, 40, or 50 gigabits per second) for the main data path of server chassis 104. As with the connection speed or bandwidth for each microserver, the bandwidth for server chassis are expected to continue to increase in the future. In addition to providing greater bandwidth for the main data path, Ethernet switches 150 and 152 can also provide redundancy in case one Ethernet switch fails, becomes a bottleneck for data traffic, or is otherwise unavailable.

CBMC 118 can manage Ethernet switches 150 and 152 via network interface 121, which can include hardware and/or software executed by processor 154 of CBMC 118. Such management of Ethernet switches 150 and 152 by CBMC 118 may include, for example, control of power supplied to Ethernet switches 150 and 152, distribution of data traffic between Ethernet switches 150 and 152, and/or monitoring of data traffic handled by each Ethernet switch.

As shown in FIG. 2, CBMC 118 also connects to a management network for remotely collecting information or monitoring server chassis 104, such as by monitor node 112 or client nodes 114 or 116 in FIG. 1. The management network may use Intelligent Platform Management Interface (IPMI), for example, or a restful interface such as Redfish.

CBMC 118 can also control enclosure service devices, such as, for example, power supplies, voltage sensors, temperature sensors, fans, indicator lamps, or displays (e.g., Liquid Crystal Display (LCD) with touchscreen) for server chassis 104. In addition, processor 154 of CBMC 118 can assign location-specific hostnames to each microserver in microserver pool 148 by executing CBMC firmware 12 or other software of CBMC 118, as discussed below with respect to the microserver hostname creation process of FIG. 3. Processor 154 can include, for example, a microcontroller, a System on a Chip (SoC), a Digital Signal Processor (DSP), an Application Specific Integrated Circuit (ASIC), a Field Programmable Gate Array (FPGA), hard-wired logic, analog circuitry and/or a combination thereof.

Non-Volatile Memory (NVM) 156 of CBMC 118 can include, for example, a solid-state memory. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete Non-Volatile Memory (NVM) chips, or any combination thereof.

As shown in FIG. 2, NVM 156 also stores microserver pool information 10, which can include a hostname assigned to server chassis 104 or other information about the microservers in mircroserver pool 148. Such information can include, for example, Media Access Control (MAC) addresses, location information for each microserver such as aisle, rack, tray, and/or device slot numbers for different microservers. The information included in microserver pool information 10 can be used for management and/or monitoring of microservers in microserver pool 148 by a remote device on network 102 (e.g., monitor node 112 or clients 114 or 116 in FIG. 1) or by a remote device external to server chassis 104 on the management network. For example, a microserver hostname, device slot number, and/or MAC address may be used by a remote device to identify a drive fault or temperature condition associated with a particular microserver in microserver pool 148.

In addition, the location information of microserver pool information can allow processor 154 to automatically assign or create hostnames for the microservers in microserver pool 148 and/or associate the microservers with MAC address for the microservers, which can also be stored as part of microserver pool information 10. As discussed in more detail below, such automatic assignment of microserver hostnames can ordinarily reduce the number of errors in the microserver hostnames (e.g., formatting or typographical errors) while significantly reducing the amount of time needed to assign hostnames to microservers.

In this regard, the automatic assignment of microserver hostnames by CBMC 118 allows for scalability when many server chassis are used, such as in one or more data centers. For example, a data center may include tens of thousands or even hundreds of thousands of microservers that may each need to be assigned location-specific hostnames. In such an example, a large number of microservers can be assigned location-specific hostnames, without costing much additional time. In addition, since the microserver hostnames indicate a physical location of the microserver, the location-specific microserver hostnames can help a network administrator physically locate microservers among a large number of microservers when performing tasks such as replacing or repairing a particular microserver.

In some implementations, microserver pool information 10 or portions thereof may be stored in a different memory, such as a volatile memory (e.g., Dynamic RAM (DRAM)) of CBMC 118 and may include other information obtained from µBMCs of the microservers in microserver pool 148 via BMC communication manager 130. Such information can include, for example, a Central Processing Unit (CPU) type of a microserver, the number of processing cores used by a microserver, a DRAM capacity of a microserver, an amount of non-volatile data storage capacity available at the microserver, a non-volatile storage type provided by the microserver (e.g., flash memory, Storage Class Memory (SCM), or a Hard Disk Drive (HDD)), a supply voltage to the microserver, and/or a board temperature for the microserver.

As shown in FIG. 2, CBMC 118 communicates with each microserver in microserver pool 148 through BMC communication manager 130, which directly communicates with a µBMC at each microserver. In some implementations, CBMC 118 can communicate with BMC communication manager 130 using multiple protocols, such as Inter-Integrated Circuit (I2C) and Universal Asynchronous Receiver/Transmitter UART. Controller 160 of BMC communication manager 130 may translate at least one protocol to a different protocol for communication with a µBMC (e.g., µBMCs 164 and 166) at each microserver in microserver pool 148. Examples of such translation by a BMC communication manager are provided in co-pending U.S. patent application Ser. No. 15/640,234, filed on Jun. 30, 2017, and incorporated by reference above. Controller 160 of BMC communication manager 130 can include, for example, a microcontroller, an SoC, a DSP, an ASIC, an FPGA, hard-wired logic, analog circuitry and/or a combination thereof.

Each µBMC is directly connected to BMC communication manager 130 and can use a full duplex communication protocol such as serial UART that can facilitate a point-to-point session that would not be possible using a master/slave communication protocol such as I2C. This can allow each microserver to appear as an individual server to allow for a more granular level of communication with each microserver than traditionally available in a conventional server chassis.

CBMC 118 can select communication with one or more of the µBMCs of the microservers such as by sending an identifier or a recipient indicator corresponding to one or more microservers to BMC communication manager 130. In some cases, CBMC 118 may select a single µBMC or microserver to receive an instruction. In other cases, CBMC may send the instruction to all or multiple µBMCs or microservers. In some implementations, BMC communication manager 130 can include an FPGA or other hardware configured as a demultiplexer (demux) to send the instructions received from CBMC 118 to multiple µBMCs, and also configured as a multiplexer (mux) to receive messages from multiple µBMCs to send to CBMC 118.

In the example of FIG. 2, microserver pool 148 includes N microservers that are each located at a respective device slot number where the microserver physically connects into server chassis 104. As shown in FIG. 2, microserver 140 is located at device slot 0 and microserver 142 is located at device slot N, with one or more microservers located at device slot numbers between device slot 0 and device slot N. Device Slot Numbers (DSNs) 14 for the different microservers can be stored in NVM 159 of BMC communication manager 130. NVM 159 can include, for example, a solid-state memory. In other implementations, DSNs 14 can be stored in a volatile memory, such as a DRAM of BMC communication manager 130. In yet other implementations, the device slot numbers for the different microservers in microserver pool 148 can be alternatively or additionally stored locally at each microserver as part of microserver information stored at each µBMC (e.g., microserver information 20 in memory 210 of µBMC 164 and microserver information 24 in memory 216 of µBMC 166).

As shown in FIG. 2, microservers 140 and 142 include µBMCs 164 and 166, respectively. Each of the µBMCs include a processor (processor 212 or processor 214) and a memory (memory 210 or memory 216). The processors of the µBMCs can include, for example, a microcontroller, an SoC, a DSP, an ASIC, an FPGA, hard-wired logic, analog circuitry and/or a combination thereof. The memories of the µBMCs can include a volatile memory, such as a DRAM or a non-volatile memory, such as a flash memory.

The µBMCs can remain powered on while other components of the microserver are powered off, such as CPU 178 or 180, NVM 186 or 188, and network interfaces 151 or 153. CPUs 178 and 180 can perform processing tasks for the microservers, and can include, for example, one or more processors or other circuitry such as a microcontroller, an SoC, a DSP, an ASIC, an FPGA, hard-wired logic, analog circuitry and/or a combination thereof. NVMs 186 and 188 can include one or more solid-state memories for non-volatilely storing OS 30 or other computer-executable instructions, such as boot instructions for initializing the microserver after powering on the CPU for the microserver. Such boot instructions may include, for example, BIOS instructions and instructions for loading OS 30.

In implementations where memories 210 and 216 are volatile, the data stored in the memories of the µBMCs remain available for access even after the rest of the microserver is powered off. However, if a microserver is removed or replaced in chassis 104, microserver information 20 or microserver information 24 stored in µBMC memories 210 and 216, respectively, can be erased so that new microserver information is collected by the µBMC the next time the µBMC is powered via installation in a device slot of a server chassis. This can ordinarily facilitate hot swapping or moving microservers from one device slot to another device slot in the same or a different server chassis. In some implementations, memories 210 and 216 may include a combination of volatile and non-volatile memories for storing different portions of microserver information.

In addition, since µBMCs 164 and 166 remain powered on, µBMCs 164 and 166 can communicate with BMC communication manager 130 and CBMC 118 when other components of the microserver are powered off or are otherwise unavailable due to a failure state of the microserver. As discussed in more detail below with reference to FIGS. 3 and 5, this can allow the µBMCs to store a hostname created by CBMC 118 as part of microserver information 20 or 24 before the rest of the microserver powers up. In some implementations, a daemon of Operating System (OS) 30 executed by CPU 178 or CPU 180 can retrieve or read the hostname from the memory of the µBMC, and set the hostname as a hostname for the microserver for communicating via network interfaces 1511 and 1512 or 1531 and 1532.

Microserver CPU 178 can then provide the microserver hostname to a remote device on network 102, so that the remote device can create a locality map of microservers on network 102. In one example, CPU 178 may provide the microserver hostname to monitor node 112 in FIG. 1, so that monitor node 112 can generate a CRUSH map for distributing data objects among microservers in server network 100. As discussed above, the microserver hostname accessed by the remote device (e.g., monitor node 112) includes the device slot number. The remote device can use the device slot number in the microserver hostname when generating a locality map, such as a CRUSH map, so that data objects or processing tasks are distributed in a resilient manner. For example, the microserver hostnames can provide physical location information so that portions or erasure coded shards of data objects are not stored in the same server chassis so as to reduce the risk of not being able to access the data object due to a power failure at a particular server chassis.

In some implementations, OS 30 can include a Linux based OS or other type of OS for managing hardware and software resources of the microserver. Network interfaces 151 and 153 can include, for example, Serial Gigabit Media Independent Interface (SGMII) interfaces for providing a main data path to network 102.

Microserver information 20 or 24 may include other information in addition to a location-specific hostname assigned to the microserver. Such additional information may include, for example, a MAC address of the microserver, a CPU type of the microserver, the number of processing cores used by the microserver, a DRAM capacity of the microserver, an amount of non-volatile data storage capacity available at the microserver, a non-volatile storage type provided by the microserver (e.g., flash memory, SCM, or HDD), a supply voltage to the microserver, and/or a board temperature for the microserver.

In some implementations, portions of the microserver information may be stored in a volatile memory of memory 210, while other portions of the microserver information are stored in a non-volatile memory of memory 210. For example, a MAC address and a drive type (e.g., HDD, SCM, or SSD) could be stored in a non-volatile memory of memory 210 so that it persists after the microserver is removed or otherwise loses power to its μBMC, while other microserver information such as a device slot number and a microserver hostname are stored in a volatile memory of memory 210 so that this information is updated after the μBMC is powered on.

In addition to providing microserver information 20 or 24 to CBMC 118, CPU 178 may access the microserver information stored in the μBMC to provide portions or all of the microserver information to a remote device on network 102, such as monitor node 112 or clients 114 or 116 in FIG. 1. For example, CPU 178 may provide microserver information to a remote device on network 102 for Redfish management or for constructing a cluster of OSDs in a distributed storage network.

Example Processes

Figure 3:
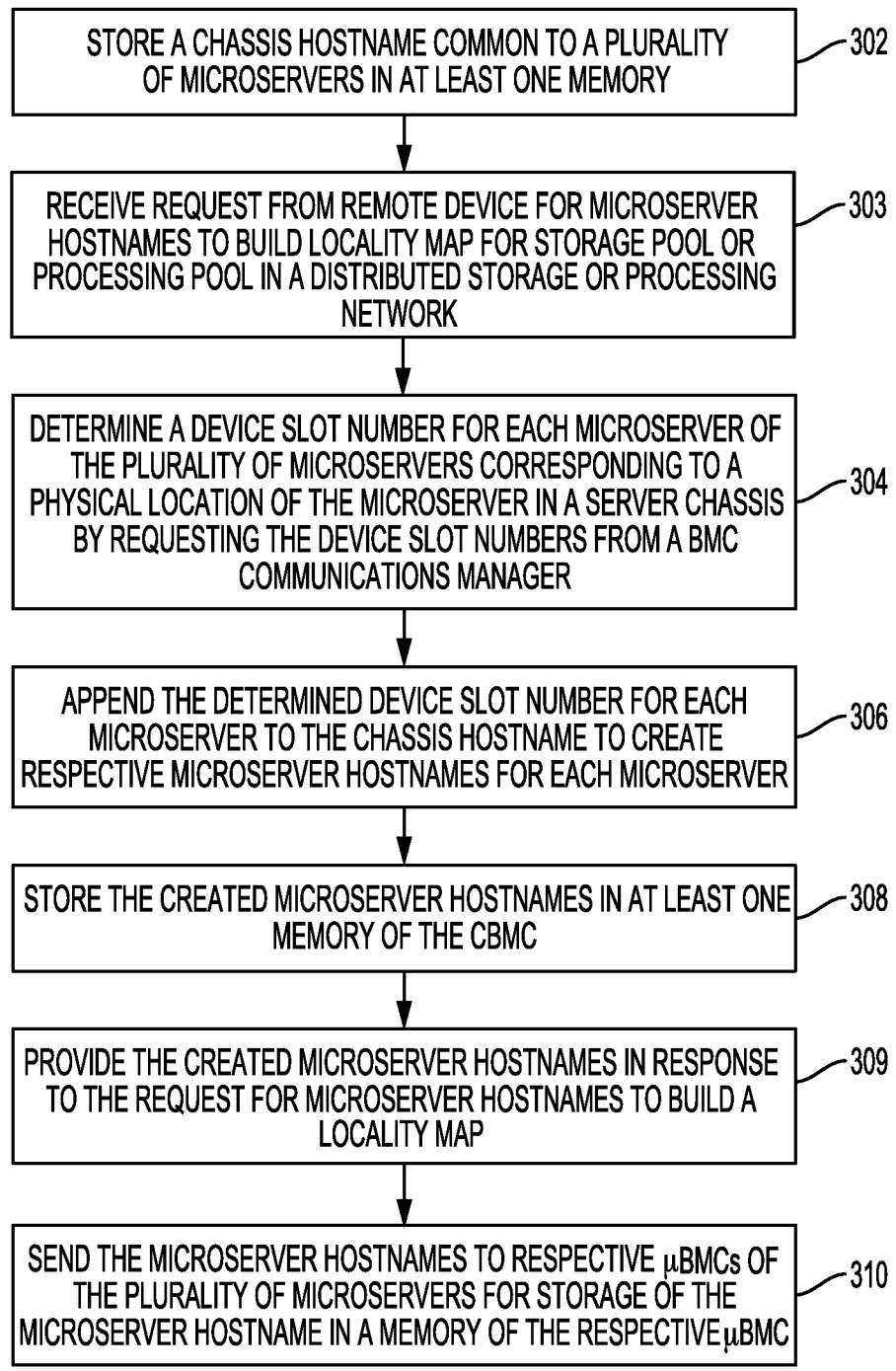
FIG. 3 is a flowchart for a microserver hostname assignment process according to an embodiment.

FIG. 3 is a flowchart for a microserver hostname assignment process that can be performed by CBMC 118 executing CBMC firmware 12 or other software according to an embodiment. In block 302, processor 154 of CBMC 118 can store a chassis hostname common to the microservers in server chassis 104 in at least one memory, such as NVM 156. The chassis hostname may have been assigned to server chassis 104 via a management network or through network 102 by a remote device such as monitor node 112 or clients 114 or 116 in FIG. 1. The chassis hostname may be location specific by identifying server chassis 104. Processor 154 may store the hostname assigned to server chassis 104 as part of microserver pool information 10.

In block 303, processor 154 of CBMC 118 receives a request from a remote device external to server chassis 104 for microserver hostnames in server chassis 104 to build a locality map for a storage pool or processing pool in a distributed storage or processing network, such as server network 100. The request may come from, for example, monitor node 112 or one of clients 114 or 116 in FIG. 1 via network 102, or may come from a remote device on the management network. As discussed above, the requested microserver hostnames can indicate a physical location of each microserver that may be used by the remote device in building a locality map.

In block 304, processor 154 of CBMC 118 determines a device slot number for each microserver in microserver pool 148 corresponding to a physical location of the microserver in server chassis 104. In more detail, processor 154 can request the device slot numbers for the different microservers from BMC communication manager 130, which may either already have the device slot numbers stored as part of DSNs 14 in NVM 159 or may then request the device slot numbers from the μBMCs of the microservers. As discussed above with reference to FIG. 2, the μBMCs of the microservers may also locally store its device slot number. In other implementations, CBMC 118 may have already requested and locally stored device slot numbers received from BMC communication manager 130 or the μBMCs.

In block 306, processor 154 of CBMC 118 appends the device slot numbers determined in block 304 for each microserver to the chassis hostname stored in block 302 to create respective microserver hostnames for each microserver. The created microserver hostnames therefore provide a location for each microserver since the microserver hostnames include a device slot number for the microserver.

For example, a chassis hostname for the server chassis may include a function for the microservers in the server chassis, such as a web server function, in addition to a site location, such as a site in the city of San Jose. The example chassis hostname may also include a rack number where the server chassis is located, a server chassis number for the chassis, and a domain name for network 102. Such an example chassis hostname for a chassis identified as "08" in rack "01" with a domain of wdc.net, may appear as, for example, web1.sjc.01.08.wdc.net. This chassis hostname may be stored in CBMC 118 since it would be common to all of the microservers in microserver pool 148.

In creating microserver hostnames for each microserver, processor 154 can append device slot numbers to the chassis hostname following a particular hostname syntax or format. Continuing with the above example chassis hostname, a microserver hostname for microserver 140 at device slot 0 could be web1.sjc.01.08.00.wdc.net, and a microserver hostname for microserver 142 at device slot N could be web1.sjc.01.08.N.wdc.net. The hostname syntax or format may be included as part of CBMC firmware 12 or other software that helps to ensure a consistent naming structure that is compatible or usable by a software defined storage or processing platform implemented on network 102. The hostname syntax or format may also be configurable and disabled if so desired.

In block 308 of FIG. 3, processor 154 stores the microserver hostnames created in block 306 in at least one memory of CBMC 118, such as in NVM 156 as part of microserver pool information 10. The created microserver hostnames are assigned to particular microservers in microserver pool 148.

In block 309, the created microserver hostnames are provided in response to the request in block 303 to build a locality map for a storage pool or processing pool in a distributed storage or processing network. For example, monitor node 112 in FIG. 1 may access or receive microserver hostnames from CBMC 118 for building a CRUSH map for distributing data objects among microservers in server network 100, which may each serve as an OSD. In some implementations, the assigned microserver hostnames may only be temporarily stored at CBMC 118, such as in a volatile memory, and are instead accessed by CBMC 118 or a remote device from each microserver if needed later on.

In block 310, processor 154 of CBMC 118 sends the microserver hostnames created in block 306 to respective μBMCs of the microservers in microserver pool 148 via BMC communication manager 130. The microserver hostnames are then stored by the processors of the μBMCs (e.g., processors 212 and 214 in FIG. 2) in a memory of the μBMC (e.g., memory 210 or 216 in FIG. 2). As discussed below in more detail with reference to FIG. 5, the microserver hostname stored in each μBMC can be retrieved by a CPU of the microserver for setting the microserver hostname as a hostname for communicating on network 102 or for providing to a remote device outside of server chassis 104 to build a locality map.

By using the CBMC to automatically assign hostnames for each microserver that indicate a physical location of the microserver, it is ordinarily possible to reduce the amount of time it takes to provide such hostnames to numerous microservers in one or more server chassis. Such automatic microserver hostnaming is also typically more consistent in following a naming syntax or format used by the server network and is less likely to include typographical errors than hostnames manually entered by a network administrator responsible for managing the server network. The assigned microserver hostnames can also provide a network administrator with information about the physical location of the microserver, such as when one microserver out of thousands of microservers may need to be physically replaced or repaired.

Figure 4:
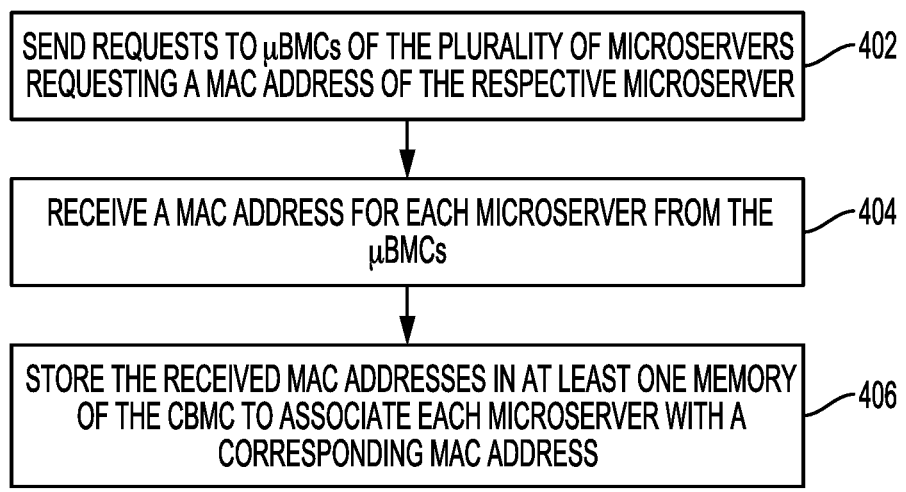
FIG. 4 is a flowchart for a Media Access Control (MAC) address process according to an embodiment.

FIG. 4 is a flowchart for a MAC address process that can be performed by processor 154 of CBMC 118 according to an embodiment. In block 402, processor 154 of CBMC 118 sends requests to μBMCs in microserver pool 148 requesting a MAC address of each microserver. As discussed above with reference to microserver information stored in a μBMC (e.g., microserver information 20 and microserver information 24 in FIG. 2), a MAC address for each microserver may be stored in the μBMC of the microserver so that the MAC address for the microserver is available even when the microserver is powered off or otherwise unavailable, such as due to a failure state of the microserver. In other cases, a processor of the μBMC may request the MAC address from another memory of the microserver (e.g., NVM 186) to return to CBMC 118.

In block 404, CBMC 118 receives a MAC address for each microserver in microserver pool 148 via BMC communication manager 130. The received MAC addresses are then stored in block 406 in at least one memory of CBMC 118 to associate each microserver with a corresponding MAC address. In some implementations, the received MAC addresses may be stored as part of microserver pool information 10 in NVM 156 of CBMC 118.

The MAC addresses may then be accessed by a remote device outside of server chassis 104, such as by a monitor node or a client on network 102 for network management. In such implementations, processor 154 of CBMC 118 may receive a request for one or more MAC addresses from the remote device via network interface 121 or a management network connected to CBMC 118. In other implementations, the MAC addresses may be obtained by CBMC 118 from μBMCs at the microservers via BMC communication manager 130.

Figure 5:
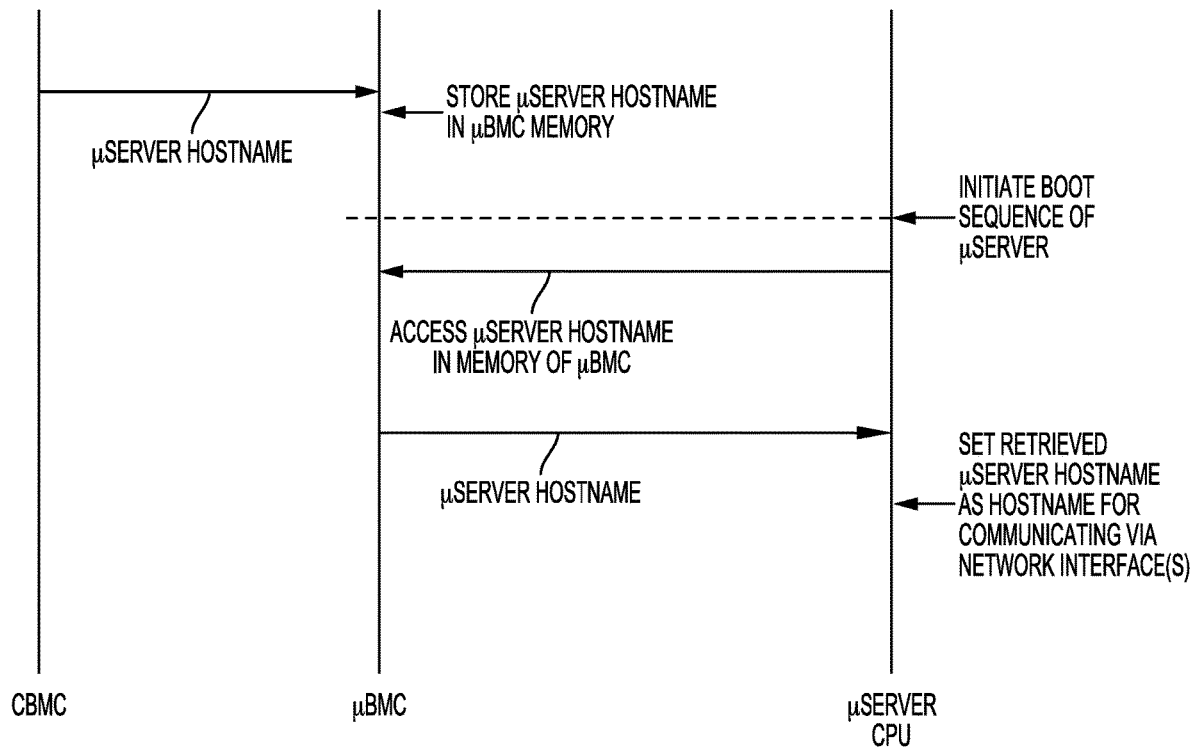
FIG. 5 is a sequence diagram for setting a microserver hostname according to an embodiment.

FIG. 5 is a sequence diagram for setting a microserver hostname according to an embodiment. In some implementations, the sequence shown in FIG. 5 may occur after the microserver hostname creation process of FIG. 3 discussed above. As shown in FIG. 5, a microserver hostname is sent from CBMC 118 to a μBMC, such as μBMC 164 or μBMC 166 of microservers 140 and 142, respectively. The μBMC then stores the microserver hostname in a memory of the μBMC (e.g., memory 210 or memory 216 in FIG. 2). In this regard, a processor of the μBMC (e.g. processor 212 or processor 214 in FIG. 2) may execute μBMC firmware 22 in receiving the microserver hostname from CBMC 118 and storing the microserver hostname in the memory of the μBMC.

A boot sequence of the microserver is initiated at the dashed line shown in FIG. 5. The microserver CPU (e.g., CPU 178 or CPU 180 in FIG. 2) accesses the microserver hostname from the memory of the μBMC. In this regard, a daemon of an OS executed by the microserver CPU may pull or retrieve the microserver hostname from the μBMC memory. The OS then sets the retrieved microserver hostname as a hostname for the OS that is used for communicating via one or more network interfaces of the microserver (e.g., network interfaces 151 or 153 in FIG. 2).

The sequence of FIG. 5 ordinarily improves the setting of microserver hostnames by allowing a CPU of the microserver to retrieve the hostname from the μBMC at a later time when the microserver is booted. In some cases, this can help facilitate changes to the microserver hostname since the microserver can be powered off before changing the microserver hostname stored in the μBMC. In addition, if a microserver needs to be replaced due to a failure or other reason such as reaching a critical storage capacity, the microserver can be physically located using a location-specific hostname accessed from the μBMC using the CBMC.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Chassis Baseboard Management Controller (CBMC), comprising:
   at least one memory for storing data related to a plurality of microservers in a server chassis that includes the CBMC; and
   a CBMC processor configured to:
      receive a request from a remote device for microserver hostnames to build a locality map for a storage pool or processing pool in a distributed storage or processing network;
      determine a device slot number for each microserver of the plurality of microservers, the device slot number corresponding to a physical location of the microserver in the server chassis;
      append the determined device slot number for each microserver to a chassis hostname to create respective microserver hostnames for each microserver of the plurality of microservers;
      provide the created microserver hostnames in response to the request for microserver hostnames to build a locality map for a storage pool or processing pool in a distributed storage or processing network; and
      send the created microserver hostnames to respective Micro Baseboard Management Controllers (µBMCs) of the plurality of microservers in the server chassis for storage of the created microserver hostname in a volatile memory of the respective µBMC configured to erase the microserver hostname after power is removed from the µBMC, wherein a non-volatile memory of the µBMC is configured to store at least one of a Media Access Control (MAC) address and a drive type that are not erased after power is removed from the µBMC, and
      wherein at least one of the respective µBMCs is configured to remain powered on after a remainder of the microserver has powered off.

2. The CBMC of claim 1, wherein the CBMC processor is further configured to:
   communicate with the plurality of microservers through a Baseboard Management Controller (BMC) communication manager; and
   request device slot numbers from the BMC communication manager for the plurality of microservers to determine a device slot number for each microserver of the plurality of microservers.

3. The CBMC of claim 1, wherein the CBMC processor is further configured to:
   send requests to µBMCs of the plurality of microservers requesting the MAC address of the respective microserver;
   receive a MAC address for each microserver of the plurality of microservers from the µBMCs; and
   store the received MAC addresses in the at least one memory to associate each microserver of the plurality of microservers with a corresponding MAC address.

4. The CBMC of claim 1, wherein the CBMC processor is further configured to store the chassis hostname in the at least one memory.

5. The CBMC of claim 1, wherein the CBMC processor is further configured to store the created microserver hostnames in the at least one memory.

6. The CBMC of claim 1, wherein each microserver of the plurality of microservers includes at least one of a System on a Chip (SoC), microcontroller, Digital Signal Processor (DSP), Field Programmable Gate Array (FPGA), and an Application Specific Integrated Circuit (ASIC).

7. A method for assigning a microserver hostname, the method comprising:
   receiving a request from a remote device for microserver hostnames to build a locality map for a storage pool or processing pool in a distributed storage or processing network;
   determining a device slot number for each microserver of a plurality of microservers in a server chassis that includes a Chassis Baseboard Management Controller (CBMC), the device slot number corresponding to a physical location of the microserver in the server chassis;
   appending the determined device slot number for each microserver of the plurality of microservers to a chassis hostname using a processor of the CBMC to create respective microserver hostnames for each microserver of the plurality of microservers;
   providing the created microserver hostnames in response to the request for microserver hostnames to build a locality map for a storage pool or processing pool in a distributed storage or processing network; and
   sending the created microserver hostnames using the processor of the CBMC to respective Micro Baseboard Management Controllers (µBMCs) of the plurality of microservers in the server chassis for storage of the created microserver hostname in a volatile memory of the respective µBMC configured to erase the microserver hostname after power is removed from the µBMC, wherein a non-volatile memory of the µBMC is configured to store at least one of a Media Access Control (MAC) address and a drive type that are not erased after power is removed from the µBMC, and
   wherein at least one of the respective µBMCs is configured to remain powered on after a remainder of the microserver has powered off.

8. The method of claim 7, wherein the CBMC is configured to communicate with the plurality of microservers through a Baseboard Management Controller (BMC) communication manager, and wherein in determining a device slot number for each microserver of the plurality of microservers, the processor of the CBMC is further configured to request device slot numbers from the BMC communication manager for the plurality of microservers.

9. The method of claim 7, further comprising:
sending requests to μBMCs of the plurality of microservers requesting the MAC address of the respective microserver;
receiving a MAC address for each microserver of the plurality of microservers from the μBMCs; and
storing the received MAC addresses in the at least one memory of the CBMC to associate each microserver of the plurality of microservers with a corresponding MAC address.

10. The method of claim 7, further comprising storing the chassis hostname in at least one memory of the CBMC.

11. The method of claim 7, further comprising storing the created microserver hostnames in at least one memory of the CBMC.

12. A non-transitory computer readable medium storing computer-executable instructions for assigning a microserver hostname, wherein when the computer-executable instructions are executed by a processor of a Chassis Baseboard Management Controller (CBMC) configured to communicate with a plurality of microservers in a server chassis that includes the CBMC, the computer-executable instructions cause the processor to:
receive a request from a remote device for microserver hostnames to build a locality map for a storage pool or processing pool in a distributed storage or processing network;
determine a device slot number for each microserver of the plurality of microservers, the device slot number corresponding to a physical location of the microserver in the server chassis;
append the determined device slot number for each microserver to a chassis hostname to create respective microserver hostnames for each microserver of the plurality of microservers;
provide the created microserver hostnames in response to the request for microserver hostnames to build a locality map for a storage pool or processing pool in a distributed storage or processing network; and
send the created microserver hostnames to respective Micro Baseboard Management Controllers (μBMCs) of the plurality of microservers in the server chassis for storage of the created microserver hostname in a volatile memory of the respective μBMC configured to erase the microserver hostname after power is removed from the μBMC, wherein a non-volatile memory of the μBMC is configured to store at least one of a Media Access Control (MAC) address and a drive type that are not erased after power is removed from the μBMC, and
wherein at least one of the respective μBMCs is configured to remain powered on after a remainder of the microserver has powered off.

* * * * *